No. 632,396. Patented Sept. 5, 1899.
J. BRIGHTMORE.
GULLY TRAP FOR DRAINS.
(Application filed Sept. 6, 1898.)
(No Model.)
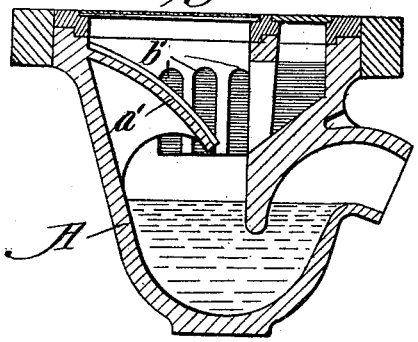
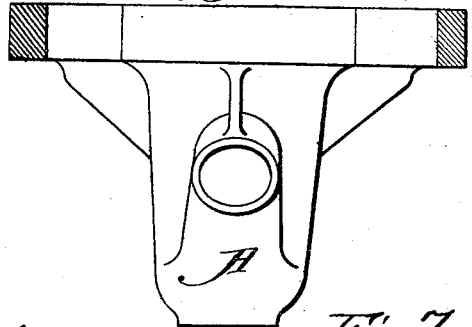
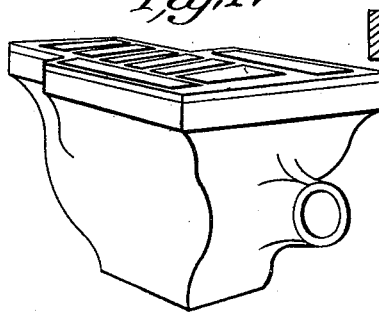
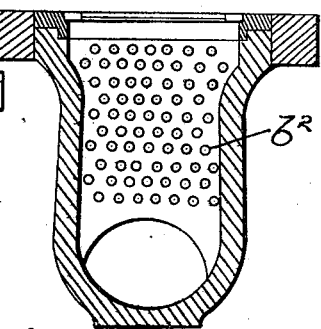
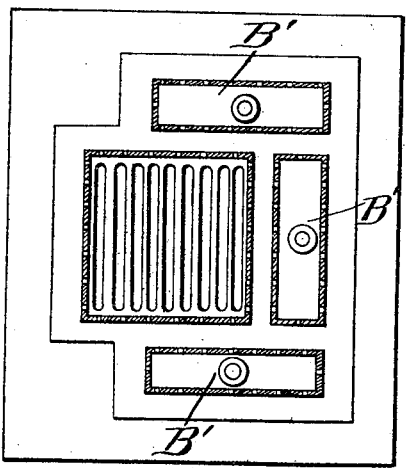
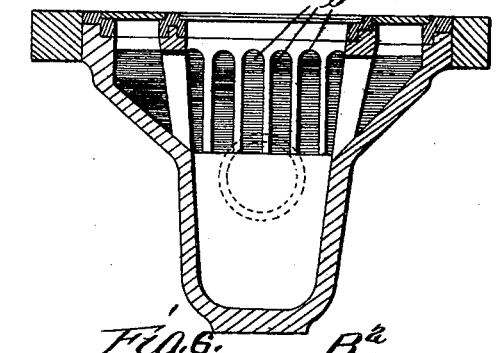
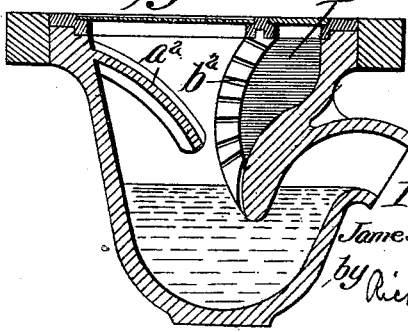
Attest
Wm. F. Hall
Inventor
James Brightmore
by Richards &co
Attys.

UNITED STATES PATENT OFFICE.

JAMES BRIGHTMORE, OF TIDESWELL, ENGLAND, ASSIGNOR TO JAMES ALSOP, OF WHATSTANDWELL, ENGLAND.

GULLY-TRAP FOR DRAINS.

SPECIFICATION forming part of Letters Patent No. 632,396, dated September 5, 1899.

Application filed September 6, 1898. Serial No. 690,354. (No model.)

*To all whom it may concern:*

Be it known that I, JAMES BRIGHTMORE, sculptor and builder, a subject of the Queen of Great Britain, residing at Tideswell, in the county of Derby, England, have invented certain new and useful Improvements in Gully-Traps for Drains, (for which applications for patents have been made in Great Britain, No. 9,006, dated April 18, 1898; in France, No. 267,927, dated July 28, 1898; in Belgium, No. 107,207, dated July 29, 1898, and in Germany, dated July 27, 1898,) of which the following is a specification.

The object of my invention is to produce a disinfecting and deodorizing gully-trap which is simple in construction and efficient in action, all bacteria and microbes being destroyed before entering the sewers, while the oxygen given off from the disinfectant deodorizes all noxious vapors.

The use of my improved gully-trap is practicable in all water conservancy and is of special service where there is only an intermittent flow of sewage or where the sewage stagnates and becomes highly putrefactive. If generally adopted, the sewage matter on arrival at the precipitating-tanks will require but little treatment.

The invention is illustrated in the accompanying drawings, in which—

Figure 1 is a perspective view of a form adapted more especially for use in hospitals and barracks. Fig. 2 is a plan view thereof. Fig. 3 is a central vertical section. Fig. 4 is a section at right angles to Fig. 3, and Fig. 5 is an end elevation. Fig. 6 is a sectional view of a modification adapted more especially for tropical climates. Fig. 7 is a section at right angles to Fig. 6.

According to my invention the sealed gully-trap A, which may be of earthenware or metal, is molded or otherwise formed or provided with an auxiliary box attachment, chamber, or receptacle for containing a disinfectant composed of a large percentage of manganate of potash or the like, capable of giving out oxygen when the sewage matter comes in contact therewith, the disinfecting media being closely packed in the receptacle. The front or sides of the latter are formed with slots, openings, or perforations to allow the disinfectant to be thoroughly exposed to and mingle with the water entering through the grid of the trap A. In like manner any foul air or gas arising from the water in the trap mingles with and is neutralized by the disinfectant in the box, which is provided with a suitable lid or cover to allow of the ready removal and replacement of the disinfectant.

In the form of gully-trap shown in Figs. 1 to 5, intended for use more particularly in hospitals, barracks, and the like, the disinfecting box or chamber $B'$ is arranged in front and also at the sides of the gully and is formed with a grooved chute or plate $a'$, as shown in Fig. 3, for deflecting the water or sewage into the disinfecting-box $B'$, the slots or perforations $b'$ in the sides of which allow the water to percolate therethrough.

In the form shown in Figs. 6 and 7, which is intended for use more particularly in hot climates where the specific gravitation is not so great, the gully is made of glazed earthenware and is oval in shape, the disinfecting box or chamber $B^2$ being placed in front of the gully, and in this instance may be perforated with small holes $b^2$, the gully being formed internally with an oval-shaped grooved chute $a^2$, Fig. 6, to carry the water into the disinfecting-box.

Having now described my invention, what I claim as new, and desire to secure by Letters Patent, is—

A gully-trap having a disinfecting-receptacle located out of line with the entrance and provided with a perforated wall, and a grooved deflecting-shelf located beneath the entrance and designed to direct the incoming sewage against the said perforated wall, substantially as described.

In witness whereof I have hereunto set my hand in presence of two witnesses.

JAMES BRIGHTMORE.

Witnesses:
THOMAS HEATH,
HAROLD GEORGE NIGHTINGALE.